United States Patent [19]
Endo et al.

[11] Patent Number: 5,864,446
[45] Date of Patent: Jan. 26, 1999

[54] HEAD ASSEMBLY FOR RECORDING AND REPRODUCING INCLUDING A HEAD SUPPORTING PART HAVING A PROTECTION MEMBER

[75] Inventors: Toshihiko Endo; Yuji Sasaki; Yasutaka Matsui; Yukio Miyazaki, all of Kawasaki, Japan

[73] Assignee: Fujitsu Limited, Kawasaki, Japan

[21] Appl. No.: 886,596

[22] Filed: Jul. 1, 1997

Related U.S. Application Data

[62] Division of Ser. No. 348,563, Dec. 2, 1994, Pat. No. 5,696,651.

[30] Foreign Application Priority Data

Feb. 18, 1994 [JP] Japan .................................. 6-021481

[51] Int. Cl.$^6$ ...................................................... G11B 5/48
[52] U.S. Cl. ............................................ 360/104; 360/108
[58] Field of Search .............................. 360/97.01, 98.01, 360/104, 108

[56] References Cited

U.S. PATENT DOCUMENTS

| | | | |
|---|---|---|---|
| 5,392,179 | 2/1995 | Sendoda | 360/104 |
| 5,539,596 | 7/1996 | Fontana et al. | 360/106 |
| 5,572,387 | 11/1996 | Brooks, Jr. et al. | 360/104 |
| 5,598,307 | 1/1997 | Bennin | 360/104 |
| 5,631,786 | 5/1997 | Erpelding | 360/104 |
| 5,644,454 | 7/1997 | Arya et al. | 360/104 |
| 5,657,186 | 8/1997 | Kudo et al. | 360/104 |
| 5,699,212 | 12/1997 | Erpelding et al. | 360/104 |
| 5,708,541 | 1/1998 | Erpelding | 360/104 |

*Primary Examiner*—Jefferson Evans
*Attorney, Agent, or Firm*—Greer, Burns, & Crain Ltd.

[57] ABSTRACT

A head assembly having a head for recording and reproducing and a head-supporting part for supporting the head includes a signal-conducting pattern formed on the head-supporting part and connected to the head and a protection member formed at a portion of the head-supporting part so as to protect the signal-conducting pattern, the portion being attached to a head-carrying unit for carrying said head assembly.

15 Claims, 12 Drawing Sheets

FIG. 1A PRIOR ART
FIG. 1B PRIOR ART
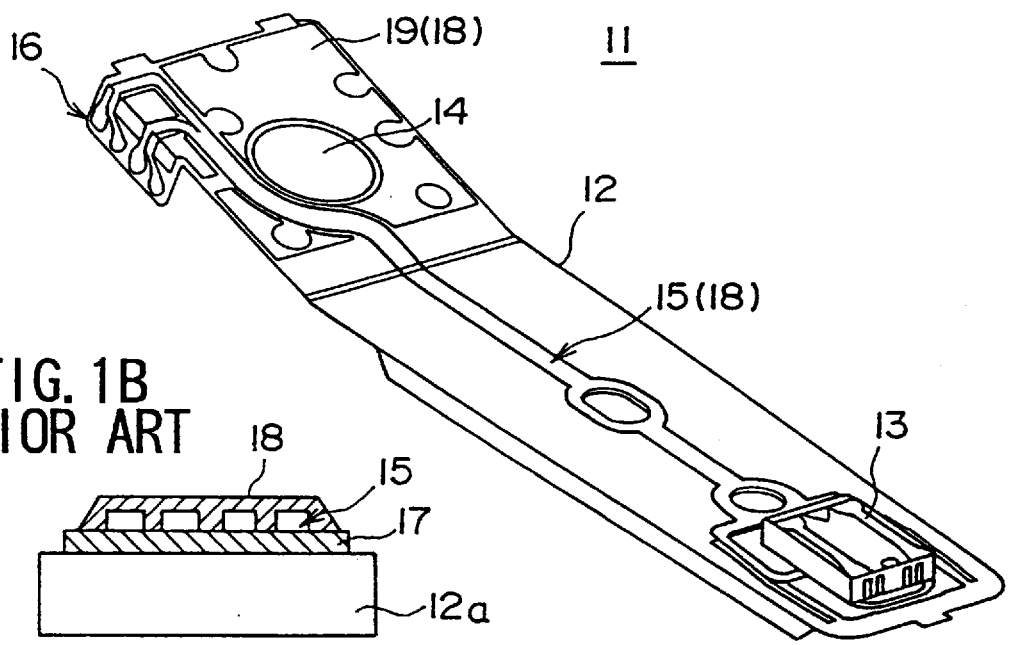
FIG. 2 PRIOR ART
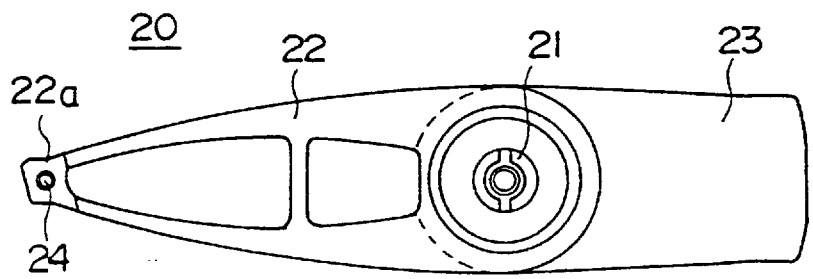

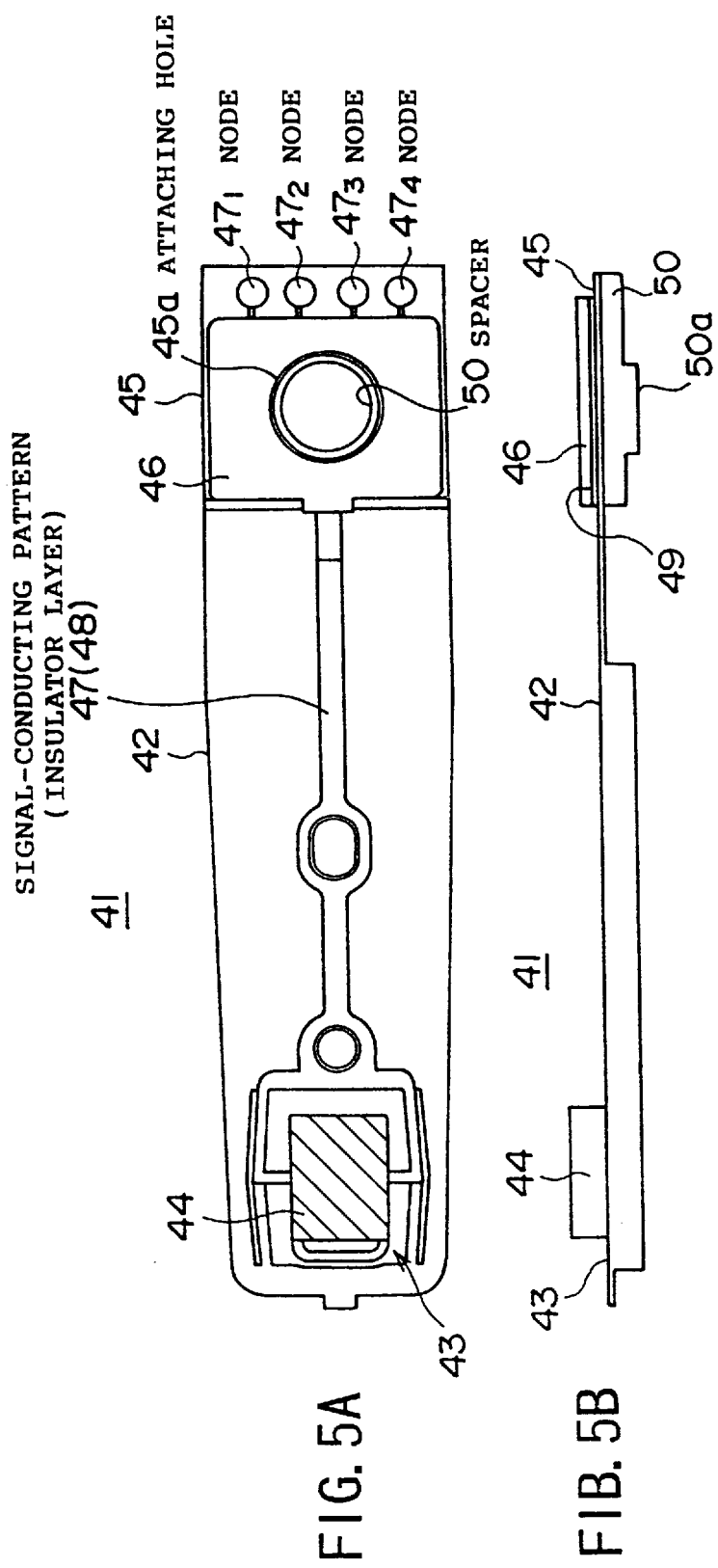

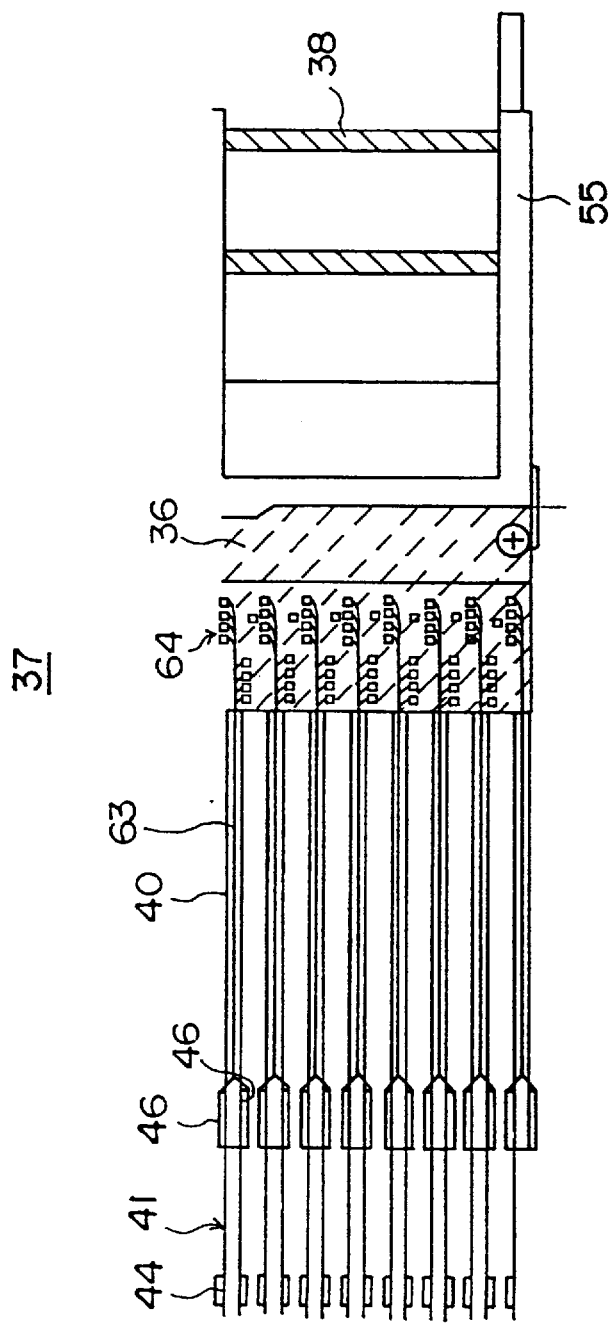

HEAD ASSEMBLY FOR RECORDING AND REPRODUCING INCLUDING A HEAD SUPPORTING PART HAVING A PROTECTION MEMBER

This is a divisional of application Ser. No. 08/348,563 filed on Dec. 2, 1994, now U.S. Pat. No. 5,696,651.

BACKGROUND OF THE INVENTION

1. Field of the Invention

The present invention relates to head assemblies and memory devices, and particularly relates to a head assembly and a memory device, which has a head at the tip thereof, and is attached to an actuator assembly or the like.

In recent years, keeping pace with the development of an increased recording density and the miniaturization of a magnetic disk device used as a memory storage, a magnetic head assembly having a magnetic head for recording and reproducing has also been subject to miniaturization. In such miniaturization, a signal-conducting pattern is often formed on a suspension of the magnetic head assembly. Thus, a signal-conducting pattern which is protected from damage in an assembling process is needed. Also, the precision of the positioning of the magnetic head on the assembly must be improved in order to achieve a high recording density.

2. Description of the Prior Art

In magnetic disk devices of the prior art, magnetic heads are provided at one side or both sides of a predetermined number of magnetic disks. A magnetic head is mounted on the tip of a suspension, which is in turn connected to a tip of a carriage arm of an actuator. The magnetic heads are moved in a radial direction of the magnetic disks by the driving of the actuator.

FIGS. 1A and 1B show an isometric view and a cross-sectional view, respectively, of a magnetic head assembly of a magnetic disk device of the prior art. In FIG. 1A, a magnetic head assembly 11 includes a magnetic head 13 mounted on a tip of a suspension 12 which is formed by bending a metal plate made of such a material as stainless steel at a predetermined angle. The magnetic head 13, which includes a thin-film head mounted on a slider, is fixed on the suspension 12 with glue and the like. Also, an attaching hole 14 is formed at a rear end of the suspension 12.

A signal-conducting pattern 15 which conducts to four signals the magnetic head 13 for recording and reproducing is formed on the suspension 12. The signal-conducting pattern 15 is coupled at one end to nodes of the magnetic head 13. Node part 16 is formed at the other end of the signal-conducting pattern 15 for leading the signals, and is located on one side of the suspension 12.

As shown in FIG. 1B, an insulator layer 17 is formed on a base material 12a of the suspension 12, and, then, the signal-conducting pattern 15 of a four-line conductive material pattern is formed with such a material as copper by etching and the like on the insulator layer 17. Finally, a protective layer 18 is formed on the signal-conducting pattern 15 with an insulating material. This protective layer 18 covers all of the signal-conducting pattern 15 and is of a thickness on the order of several micrometers. Here, at the rear end of the suspension 12, except for the attaching hole 14 and the signal-conducting pattern 15, a metal dummy pattern 19 is formed for making a flush surface with the protective layer 18. The magnetic suspension assembly 11 thus formed is attached to an actuator.

FIG. 2 shows a plan view of an actuator. In FIG. 2, an actuator 20 includes a plurality of carriage arms 22 revolving around a rod 21 and a VCM (voice coil motor) 23 having a voice coil as a driving part. The magnetic head assembly 11 is attached to a tip 22a of the carriage arm 22 which has an attaching hole 24.

FIGS. 3A and 3B show illustrative drawings explaining the attaching of the magnetic head assembly of the prior art. In FIGS. 3A and 3B, the tip 22a of the carriage arm 22 and the suspension 12 are shown in cross section perpendicular to a longitudinal direction of the carriage arm 22 and the suspension 12. As shown in FIG. 3A, a spacer 25 is fixed to the attaching hole 14 of the suspension 12. Then, the spacer 25 is fit into the attaching hole 24 of the carriage arm 22, where one of the suspensions 12 is provided on each side of the tip 22a of the carriage arm 22. In FIG. 3A, thus, the spacers 25 fixed to the suspensions 12 are provided on both the upper side and the lower side of the tip 22a to form an assembly. In FIG. 3B, a predetermined number of the assemblies are lined up in a vertical direction.

On both sides of the line of the assemblies, clamps 26a and 26b are arranged with pressing parts 27a and 27b provided thereon. Each of the pressing parts 27a and 27b has a tapered end which comes in contact with the rear end of the suspension 12. Thus, when the clamps 26a and 26b clamp, the pressing parts 27a and 27b come in contact with each other and with the suspensions 12, so that the assemblies are pressed from both the upper side and the lower side.

Then, a ball 28 is inserted into a hole formed in the spacer 25 through the attaching hole 14 of the suspension 12 so as to press the spacer 25 from the inside of the hole. Thus, the spacer 25 is pressed from the inside to the attaching hole 24 at the tip 22a of the carriage arm 22. In this manner, the magnetic head assemblies 11 are attached to the head carriage arm 22.

When pressing the suspensions 12 against the tips 22a of the carriage arms 22 with the pressing parts 27a and 27b, the tips of the pressing parts 27a and 27b often cause damage to the suspension. That is, the tips of the pressing parts 27a and 27b often scrape and cut the protective layer 18 and the signal-conducting pattern 15 formed at the rear end of the suspension 12.

Also, when gluing the magnetic head 13 to the tip of the suspension 12, the slider is distorted by contraction of the glue when it solidifies. This distortion is not uniform so that a flying height (i.e., the gap between the slider and the magnetic disk) varies between different magnetic heads. This causes a degradation of performance in magnetic disk devices.

Accordingly, there is a need in the field of magnetic disk devices for a head assembly and a memory device which have a high yield and a high performance.

SUMMARY OF THE INVENTION

Accordingly, it is a general object of the present invention to provide a head assembly and a memory device which can satisfy the need described above.

It is another and more specific object of the present invention to provide a head assembly and a memory device which have a high yield and a high performance.

In order to achieve the above objects, according to the present invention, a head assembly having a head for recording and reproducing and a head-supporting part for supporting the head includes a signal-conducting pattern formed on the head-supporting part and connected to the head and a protection member formed at a portion of the head-supporting part so as to protect the signal-conducting pattern, the portion being attached to a head-carrying unit for carrying the head assembly.

Also, in order to achieve the above objects, according to the present invention, a memory device having a head for recording and reproducing information for a memory media, a head-supporting part to and from supporting the head, a head-carrying part to which the head-supporting part is attached, a driving part for moving the head-carrying part over the memory media includes a signal-conducting pattern formed on the head-supporting part and connected to the head, and a protection member formed at a portion of the head-supporting part so as to protect the signal-conducting pattern, the portion being attached to the head-carrying part.

In the head assembly and the memory device according to the present invention, a signal-conducting pattern is formed on a head-supporting part, and a protection member is formed on the signal-conducting pattern. Thus, the signal-conducting pattern can be protected from damage caused by tools used in mounting the head-supporting part on the head-carrying part. This in turn means that the yield of the magnetic head assembly can be improved.

Furthermore, in order to satisfy the above objects, according to the present invention, a head assembly having a head for recording and reproducing and a head-supporting part for supporting the head includes a head-mounting part to which the head is attached with adhesive, and an adjusting pattern formed on the head-mounting part so as to hold a predetermined amount of the adhesive on the head-mounting part.

Also, in order to satisfy the above objects, according to the present invention, a memory device having a head for recording and reproducing information for a memory media, a head-supporting part for supporting the head, a head-carrying part to which the head-supporting part is attached, and a driving part for moving the head-carrying part over the memory media includes a head-mounting part to which the head is attached with adhesive, and an adjusting pattern formed on the head-mounting part so as to hold a predetermined amount of the adhesive on the head-mounting part.

In the head assembly and the memory device according to the present invention, an adjusting pattern can be formed on a head-mounting part in order to control the amount of adhesive pasted on the head-mounting part. Thus, the distortion of the head after the adhesive is solidified can be reduced and made uniform, and the mounting of the head can be precisely made. This means that a variation in gaps between the heads and magnetic disks can be eliminated to stabilize reproduced outputs, which leads to a high performance.

Other objects and further features of the present invention will be apparent from the following detailed description when read in conjunction with the accompanying drawings.

BRIEF DESCRIPTION OF THE DRAWINGS

FIGS. 1A and 1B show an isometric view and a cross-sectional view, respectively, of a magnetic head assembly of a magnetic disk device of the prior art;

FIG. 2 is a plan view of an actuator of the prior art;

FIGS. 5A and 5B are a plan view and a side view, respectively, of the magnetic head assembly of FIG. 4;

FIG. 11 is a cross-sectional side view of the actuator assembly attached with the magnetic head assemblies;

DESCRIPTION OF THE PREFERRED EMBODIMENTS

Figure 3A:
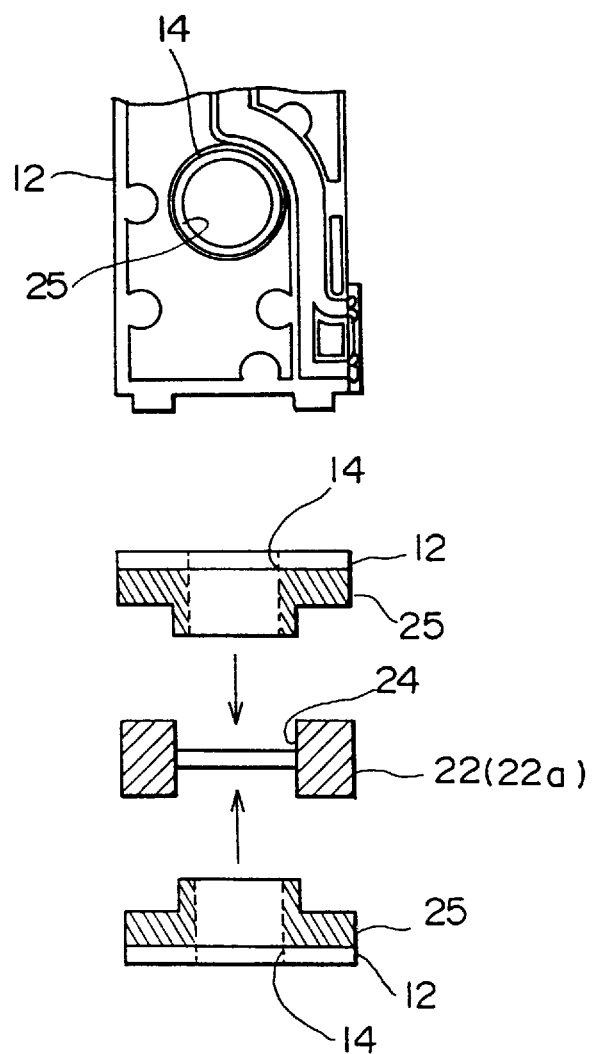
FIGS. 3A and 3B are illustrative drawings explaining the attaching of the magnetic head assembly of the prior art.
Figure 3B:
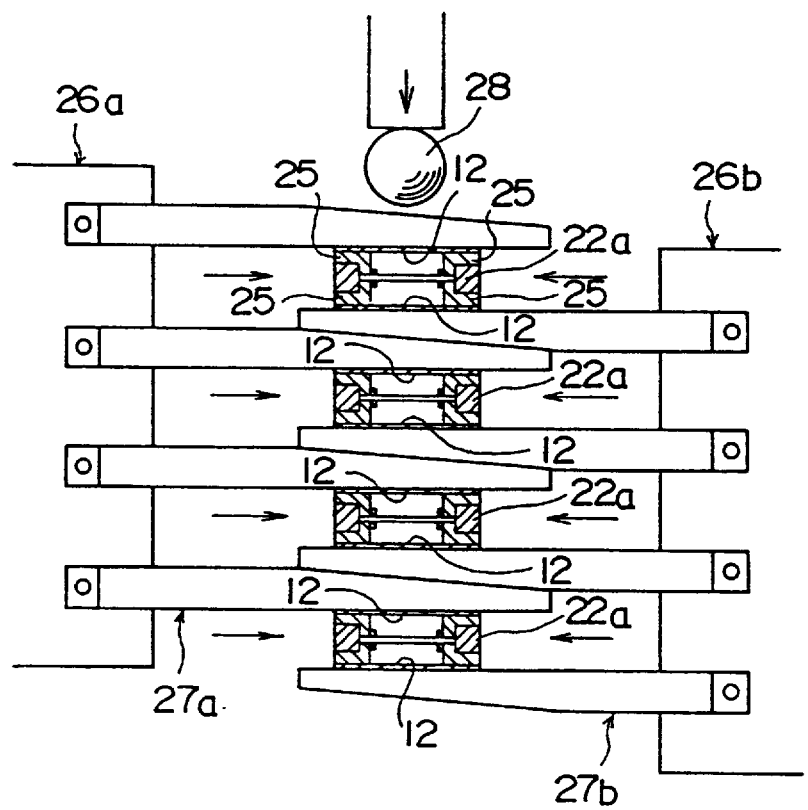
Figure 4:
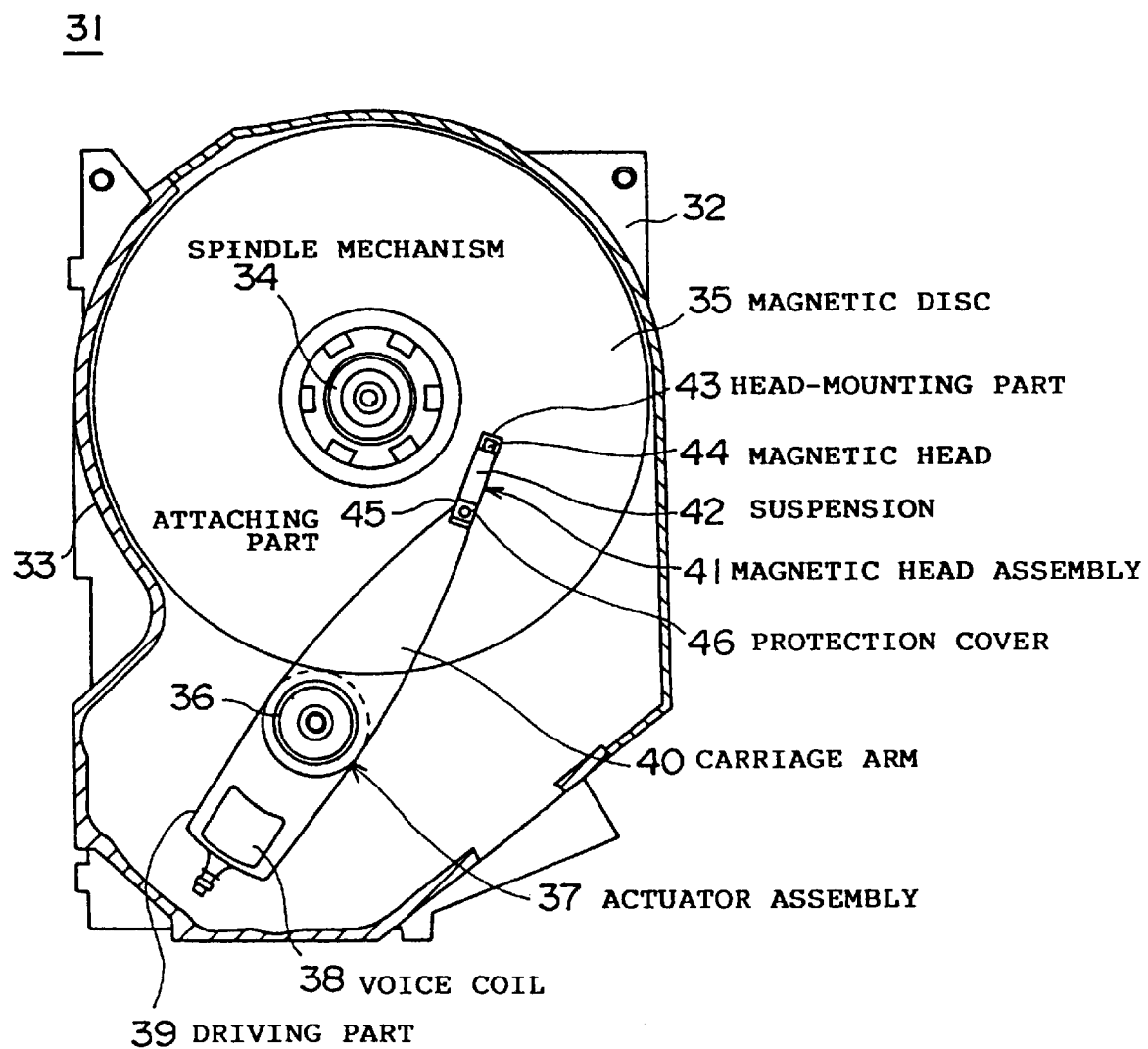
FIG. 4 is a plan view of an embodiment of the present invention.

FIG. 4 shows a plan view of an embodiment of the present invention. FIG. 4 shows the inside of a magnetic disk device 31 contained in a cover 32 and a base 33. The magnetic disk device 31 includes a predetermined number of memory-media magnetic disks 35 arranged one over another at predetermined intervals and attached to a spindle mechanism 34.

An actuator assembly 37 is provided near the magnetic disks 35, and can pivot around the revolution center 36. The actuator assembly 37 includes at one end a driving part 39 having a voice coil 38 including a voice coil motor, and, at the other end, a number of carriage arms 40 for holding heads at one side or both sides of the magnetic disks 35.

At the tip of each of the carriage arms, a magnetic head assembly 41 is attached as will be described later. A magnetic head 44 is mounted on a head-mounting part 43 at the tip of a suspension 42, which is a head-supporting part of the magnetic head assembly 41. Also, a protection cover 46 is formed on the attaching part 45 of the magnetic head assembly 41, which part is attached to the carriage arm 40.

FIGS. 5A and 5B show a plan view and a side view, respectively, of the magnetic head assembly 41 of FIG. 4.

The magnetic head assembly 41 shown in FIGS. 5A and 5B includes the head-mounting part 43 formed at one end of the suspension 42 and the attaching part 45 at the other end. An attaching hole 45a is formed in the attaching part 45. A signal-conducting pattern 47 which conducts four signals for recording and reproducing is formed on the suspension 42, and an insulator layer 48 is formed on the signal-conducting pattern 47.

Four nodes are formed at the tip of the signal-conducting pattern 47 extending to the head-mounting part 43, and are attached with the magnetic head 44 with glue. The signal-conducting pattern 47 is formed such that it extends to the attaching part 45 and leaves the attaching hole 45a uncovered. The tip of the signal-conducting pattern 47 extending to the attaching part 45 has four nodes $47_1$ to $47_4$ for electrical connection with the outside. The insulator layer 48 is not formed on the four nodes $47_1$ to $47_4$.

In the attaching part 45, a protection cover 46 is attached with an adhesive part 49 to the signal-conducting pattern 47. The protection cover 46 is either metal (e.g., stainless steel with the thickness of 50 $\mu$m) or resin (e.g., polyimide, polyurethane, phenolic, or acrylic with the thickness of 0.1 mm).

A spacer 50 with a predetermined thickness is fixed to the surface of the suspension 42 opposite the attaching part 45 by means of spot fusing with laser and the like. A caulking part 50a is integrally formed with the spacer 50, and has a cylindrical shape to fit into an attaching hole of the carriage arm 40.

Figure 6A:
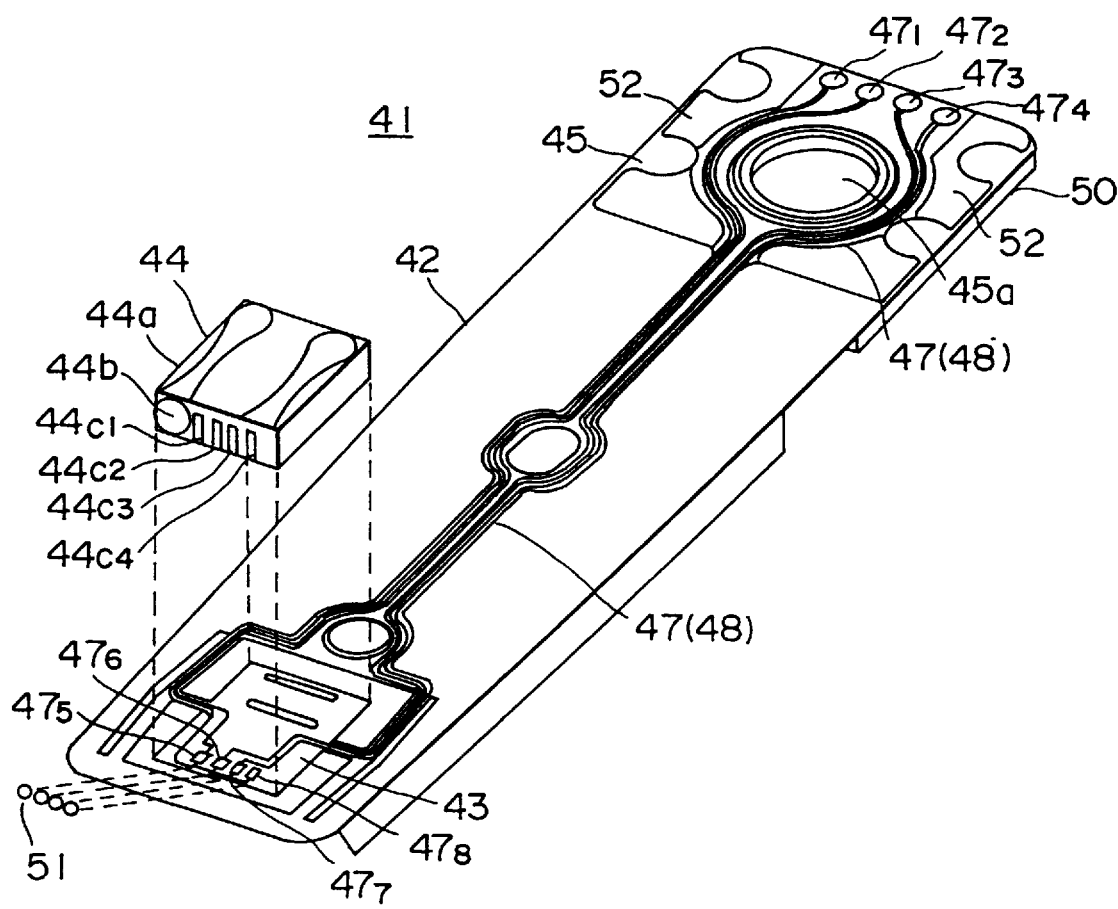
FIGS. 6A and 6B are illustrative drawings showing the internal structure of the magnetic head assembly.
Figure 6B:
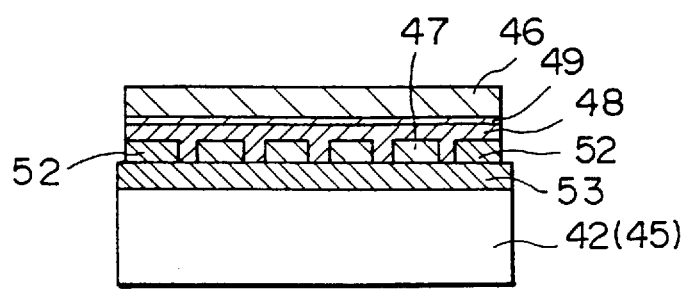

FIGS. 6A and 6B show the internal structure of the magnetic head assembly 41. FIG. 6A is an isometric view of the magnetic head assembly 41 in its entirety, and FIG. 6B is a cross-sectional view of the attaching part. As shown in FIG. 6A, nodes $47_5$ to $47_8$ extending from the signal-conducting pattern 47 without an insulator layer are formed at the tip of the head-mounting part 43 of the suspension 42.

The magnetic head 44 is formed on one surface of a slider 44a and on another surface which is provided with nodes $44_{c1}$ to $44_{c4}$ for electrical connections. Thus, the magnetic head 44 forms an L-letter shape having a thin-film head element 44b. When the magnetic head 44 is mounted on the suspension 42, the nodes $44_{c1}$ through $44_{c4}$ are respectively connected to the nodes $47_5$ through $47_8$ of the head-mounting part 43. The connections are electrically established through bumps 51 of golden balls.

A dummy pattern 52 as a supplement pattern is formed around the signal-conducting pattern 47 on the attaching part 45 of the suspension 42. A protective layer 48 is formed on the dummy pattern 52. A cross-sectional view of this portion described here is shown in FIG. 6B.

In FIG. 6B, an insulator layer 53 is formed by the spin-coat method at the thickness of 3 μm, for example, with such material as polyimide on the suspension 42 made of stainless steel and the like. The signal-conducting pattern 47 and the dummy pattern 52 are formed with such material as copper at the thickness of 4 μm, for example, by a deposition process such as electroplating (or sputtering) and etching. Except for the nodes $47_1$ through $47_4$, an insulator layer 48 made of polyimide and the like is formed on the signal-conducting pattern 47 and the dummy pattern 52 by the spin-coating method at the thickness of an order of micrometers. A similar forming process is also applied to the other parts of the attaching part 45 on the suspension 42.

Then, a protection cover 46 made of such material as stainless steel is attached with glue 49 on the protective layer 48 of the attaching part 45. The thickness of the protection cover is on the order of micrometers, for example.

Forming the dummy pattern 52 on the attaching part 45 can realize a flat surface of the protective layer 48, which results in a flat surface of the protection cover 46. This means that a height of this portion can be made with high precision within a tolerance of about 10 μm.

The spacer 50, the suspension 42 (the attaching part 45), and the protection cover 46 are all made of the same material such as stainless steel, and, thus, have an identical thermal expansion coefficient. This means that a distortion caused by possible differences in heat-induced contortion can be prevented.

The magnetic head assembly 41 has been described particularly with regard to the case where the nodes $47_1$ through $47_4$ are formed in the same plane as the protection cover 46. However, the nodes $47_1$ through $47_4$ can be formed so as to extend from one side of the suspension as shown in FIG. 1A.

Figure 7:
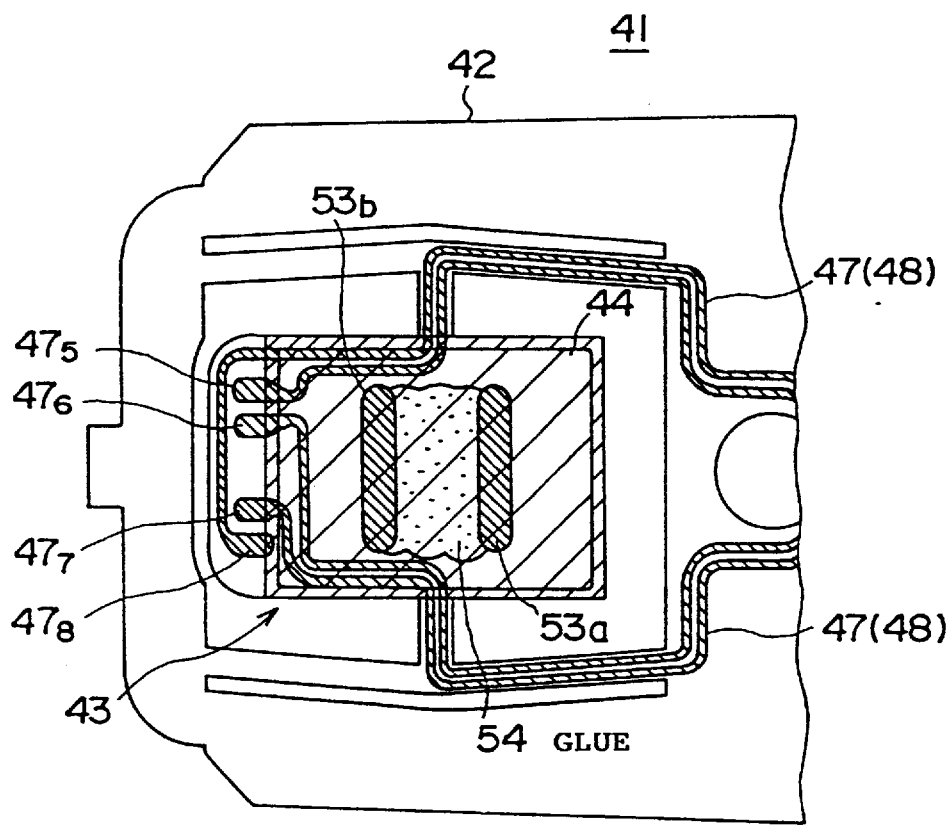
FIG. 7 is an extended view of the magnetic head portion of FIG. 5.

FIG. 7 shows an extended view of the magnetic head portion of FIG. 5. In FIG. 7, when the magnetic head 44 is mounted on the head-mounting part 43 of the suspension 42, an adjusting pattern 53a and 53b is formed on the head-mounting part 43 in the same forming process as forming the signal-conducting pattern 47. The thickness of the adjusting pattern 53a and 53b is about 10 μm, for example. The adjusting pattern 53a and 53b is formed at a predetermined interval in a lateral direction at the location mounting the magnetic head 44 such that the center of the adjusting pattern 53a and 53b coincides with the center of the magnetic head 44.

A predetermined amount of glue 54 is pasted between the adjusting pattern 53a and 53b, and the magnetic head 44 is adhered to be mounted on the suspension 42.

Since the magnetic head 44 is mounted on the adjusting pattern 53a and 53b, the height of the magnetic head 44 can be precisely adjusted, and, also, the signal-conducting pattern 47 can be protected in the process of mounting the magnetic head 44. Also, the glue 54 is pasted between the adjusting pattern 53a and 53b so that the amount of glue can be controlled. This means that the distortion of the magnetic head 44 caused by the contraction of the solidified glue 54 can be reduced. Thus, the flying height of the magnetic head 44 can be kept constant between different magnetic heads 44, and a variation in outputs of reproduced signals from different magnetic heads 44 can be prevented. This in turn means that the yield of the magnetic head assembly can be improved.

Figures 8A, 8B:
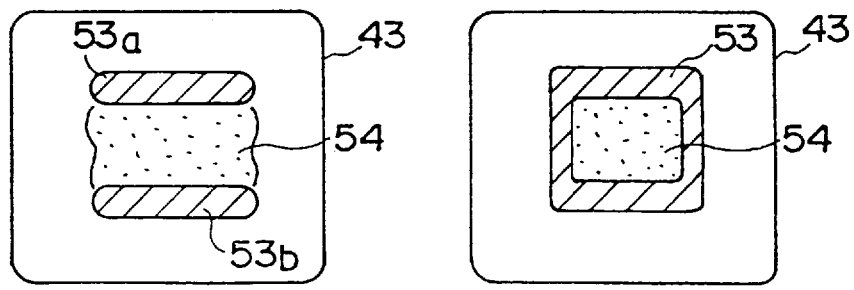
FIGS. 8A and 8B are plan views of other configurations of the adjusting patterns of FIG. 7.

FIGS. 8A and 8B show plan views of other configurations of the adjusting pattern. In FIG. 8A, the adjusting pattern 53a and 53b are formed at a predetermined interval in a longitudinal direction of the suspension 42 at the location mounting the magnetic head 44. The glue 54 is pasted between the adjusting pattern 53a and 53b.

In FIG. 8B, an adjusting pattern 53 of an open rectangle is formed in the head-mounting part 43, and the glue 54 is pasted in the adjusting pattern 53. The shape of the adjusting pattern 53 is not limited to an open rectangle, but can be an open circle or an open polygon.

Figure 9:
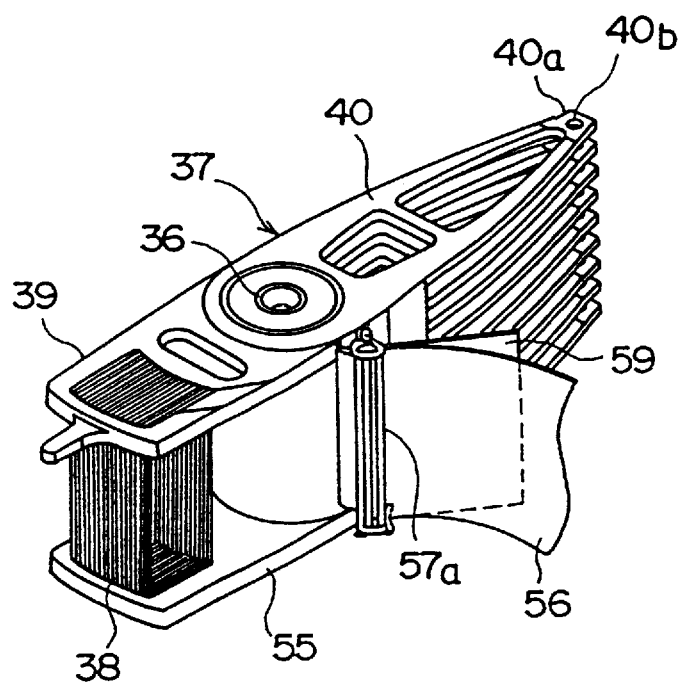
FIG. 9 is an isometric view of an actuator assembly.

FIG. 9 shows an isometric view of an actuator assembly. In FIG. 9, an actuator assembly 37 includes on one side of the revolution center 36 a predetermined number of carriage arms 40 provided at predetermined intervals, and, on the other side, a driving part 39. The driving part 39 includes a voice coil 38 mounted on a coil-supporting plate 55. A FPC (Flexible Printed Component) 56 for conducting signals for the voice coil 38 and the magnetic head 44 is supported by a supporting part 57a. Here, the part denoted by the numeral 59 is a pressing plate.

Each of the carriage arms 40 has an attaching part 40a at the tip thereof, and an attaching hole 40b is formed in the attaching part 40a. The magnetic head assemblies 41 described above are attached on one side or on both sides of the attaching parts 40a.

Figure 10A:
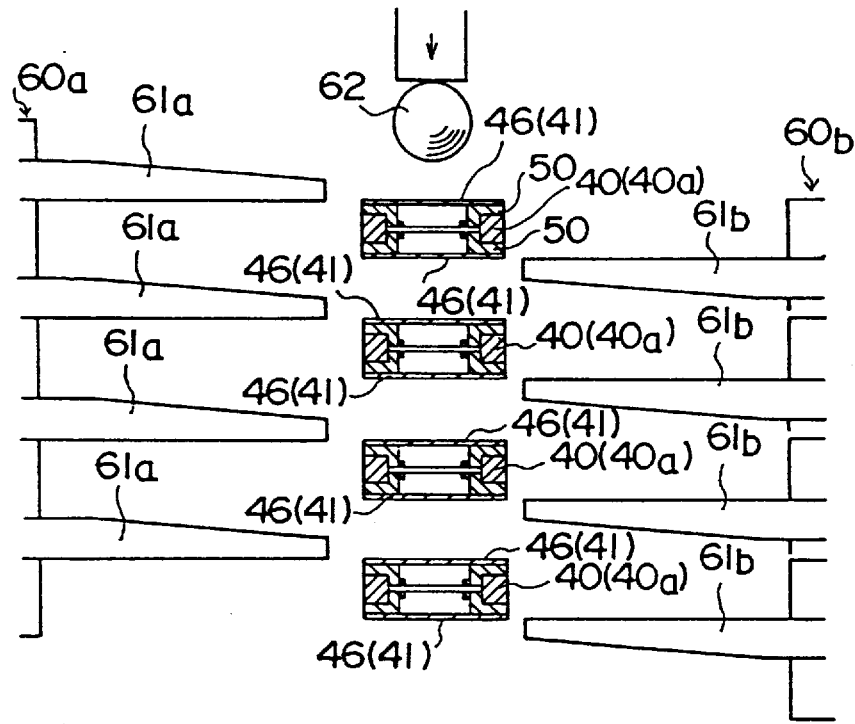
FIGS. 10A and 10B are illustrative drawings for explaining the process of mounting the magnetic head assemblies on carriage arms.
Figure 10B:
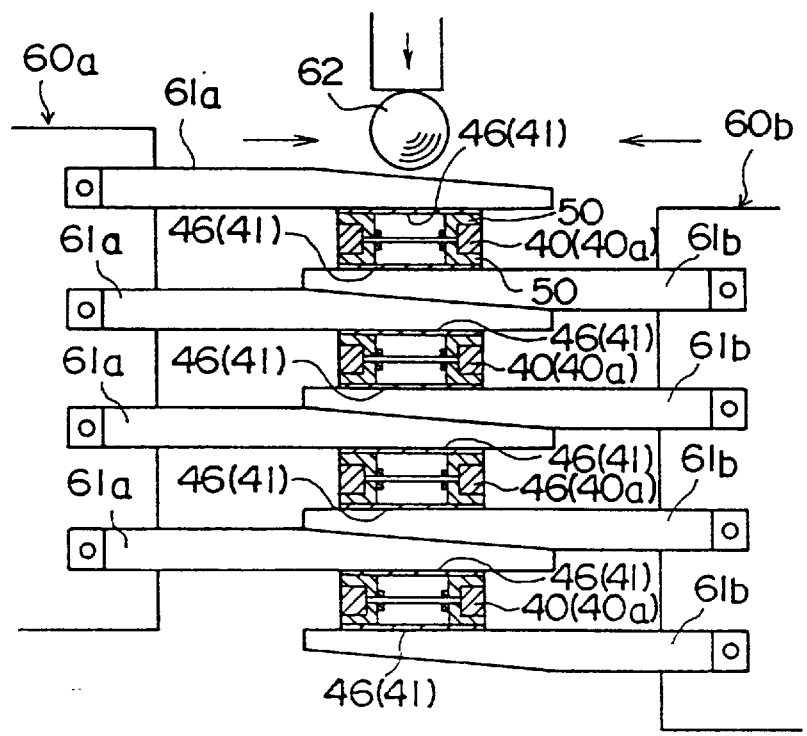

FIGS. 10A and 10B show illustrative drawings for explaining the process of mounting the magnetic head assemblies 41 on the carriage arms 40. In FIG. 10A, the magnetic head assemblies 41 are positioned on both sides of the attaching parts 40a of the carriage arms 40. Here, the attaching part 45 of the suspension 42 has the spacer 50 described before attached thereto, whose caulking part 50a is fitted into the attaching hole 40b.

Between each of the carriage arms 40 and at the location of the attaching parts 40a and 45, pressing parts 61a and 61b of a clamp 60a and 60b are positioned. Since the pressing parts 61a and 61b are to be inserted between the carriage arms 40, the tip of each of the pressing parts 61a and 61b is tapered.

As shown in FIG. 10B, the pressing parts 61a and 61b are inserted between the carriage arms 40 at the attaching part 40a thereof, and the tapered tips come in contact with each other to press the carriage arms 40 from both upper and lower sides.

While keeping this positioning, a ball 62 is inserted into the caulking part 50a of the spacer 50 through the attaching hole 45a of the attaching part 45 of the suspension 42. Thus, the caulking part 50a of the spacer 50 is pressed from the inside to be attached to the attaching hole 40b of the carriage arm 40.

As shown in FIGS. 10A and 10B, when the pressing parts 61a and 61b are moved inwards, the protection cover 46 on the attaching part 45 of the suspension 42 can protect the signal-conducting pattern 47 from the pressing parts 61a and 61b.

This embodiment has been described particularly with regard to the case where the magnetic head assemblies 41 are attached to the carriage arms 40 by the attaching holes 40b and the caulking parts 50a. Instead, attaching can be done by glue which solidifies by ultraviolet light, heat, etc. Even in this case, the pressing parts 61a and 61b are used in the process of attaching, so that the protection cover 46 is still effective in preventing the signal-conducting pattern 47 from being cut off.

FIG. 11 shows a cross-sectional side view of the actuator assembly 37 attached with the magnetic head assemblies 41. As shown in FIG. 11, the actuator assembly 37 includes the carriage arms 40 with the magnetic head assemblies 41 attached at the tips thereof.

Leads 63 connected to the nodes $47_1$ through $47_4$ of the suspension 42 extend along one side of the carriage arms 40 to be connected to a set of nodes 64 at a location near the revolution center 36. The set of nodes 64 are then connected to the FPC 56 shown in FIG. 9.

Figure 12:
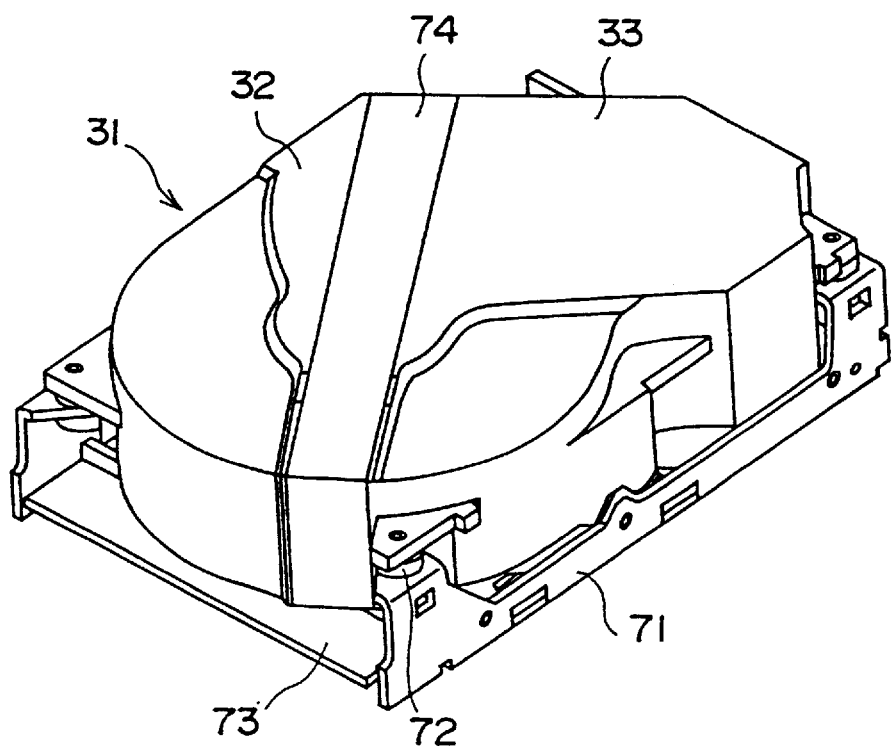
FIG. 12 is an isometric view of the magnetic disk device.
Figure 13:
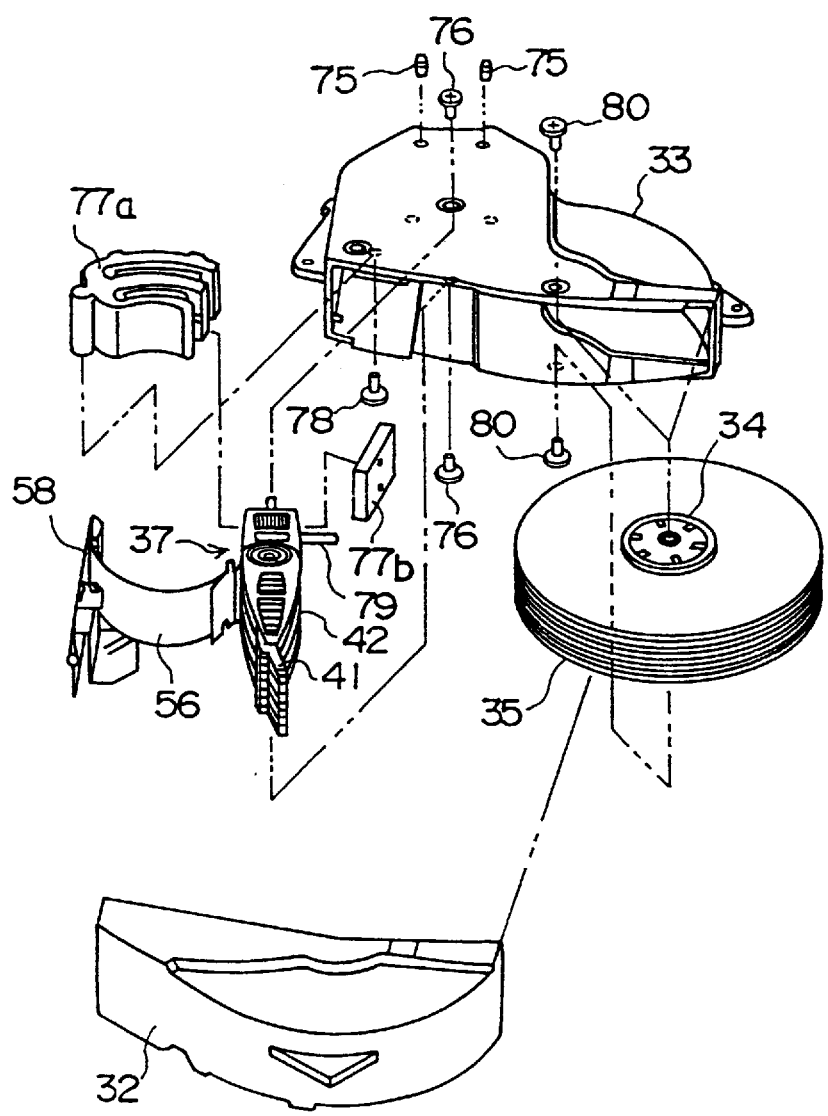
FIG. 13 is an expanded view of the magnetic disk device.

FIG. 12 shows an isometric view of the magnetic disk device, and FIG. 13 shows an expanded view of the same.

In FIG. 12, the magnetic disk device 31 contains the magnetic disk 35, the actuator assembly 37, etc. in the enclosure of the cover 32 and the base 33 shown in FIG. 4. This enclosure is attached to an attaching metal part 71 with anti-vibration rubber 72 inserted therebetween. The attaching metal part 71 is attached to a printed circuit board 73 carrying control circuits and connectors. The cover 32 and the base 33 overlap at the boundary between them, and the overlapping part is wrapped in an adhesive tape 74 so that the inside of the enclosure is completely sealed.

In FIG. 13, actuator stoppers 75 are pressed into the base 33, and the actuator assembly 37 is attached inside the base 33 with screws 76. Also, a cable-fastening plate 58, a yoke 77a, and a side yoke 77b are attached to the inside of the base 33 with a screw 78. The yoke 77a is positioned inside the voice coil 38 of the actuator assembly 37. Also, an actuator lock mechanism 79 is attached to the actuator assembly 37.

A spindle mechanism 34 provided with a predetermined number of magnetic disks 35 is attached inside the base 33 with screws 80. Then, the assembly of all of the above is capped by the cover 32, and sealed by the adhesive tape 74 as shown in FIG. 12.

According to the present invention described above, a signal-conducting pattern is formed on a head-supporting part, and a protection member is formed on the signal-conducting pattern. Thus, the signal-conducting pattern can be protected from damage caused by tools used in mounting the head-supporting part on the head-carrying part.

Also, according to the present invention, a supplement pattern is formed around the signal-conducting pattern so as to make the thickness of the protection member uniform. Thus, the pressing force by the tools for mounting can be made uniform.

Furthermore, according to the present invention, the protection member can be formed with metal or resin, and, thus, can be made easily.

Also, according to the present invention, a spacer is inserted between the head-supporting part and the head-carrying part, so that the attaching of the head-supporting part can be made easily and that the positioning of the head-supporting part can be easily adjusted.

Furthermore, according to the present invention, an adjusting pattern can be formed on a head-mounting part in order to control the amount of glue pasted on the head-mounting part. Thus, the distortion of the head after the glue is solidified can be reduced and made uniform, and the mounting of the head can be precisely made. This means that a variation in gaps between the heads and the magnetic disks can be eliminated to stabilize reproduced outputs.

Further, the present invention is not limited to these embodiments, but various variations and modifications may be made without departing from the scope of the present invention.

What is claimed is:

1. A head assembly having a head for recording and reproducing and a head-supporting part for supporting said head, said bead assembly comprising:

a signal-conducting pattern formed on said head-supporting part and connected to said head;

a supplement pattern formed around said signal conducting pattern on a portion of said head-supporting part;

a protection member mounted on said signal-conducting pattern and said supplement pattern at said portion, said portion being attached to a head carrying unit for carrying said head assembly.

2. The head assembly as claimed in claim 1, wherein said supplement pattern is flush with said signal conducting pattern so that said protection member can be formed on a flat surface formed by said supplement pattern and said signal conducting pattern.

3. The head assembly as claimed in claim 1, wherein said protection member comprises metal.

4. The head assembly as claimed in claim 1, wherein said protection member comprises resin.

5. The head assembly as claimed in claim 1, further wherein said protection member includes a hole corresponding to an attaching hole on said head-supporting part.

6. The head assembly as claimed in claim 1, wherein said protection member is separate from a protective insulating layer formed on and covering said signal conducting pattern, and further wherein said protection member includes a hole corresponding to an attaching hole on said head-supporting part.

7. A memory device having a head for recording and reproducing information for a memory media, a head-supporting part for supporting said head, a head-carrying part to which said head-supporting part is attached, and a driving part for moving said head-carrying part over said memory media, said memory device comprising:

a signal-conducting pattern formed on said head-supporting part and connected to said head;

a supplement pattern formed around said signal-conducting pattern at a portion of said head-supporting part; and a protection member mounted on said signal-conducting pattern and said supplement pattern at said portion, said portion being attached to said head-carrying part.

8. The memory device as claimed in claim 7, wherein said supplement pattern is flush with said signal conducting pattern so that said protection member can be formed on a flat surface formed by said supplement pattern and said signal conducting pattern.

9. The memory device as claimed in claim 7, wherein said protection member comprises metal.

10. The memory device as claimed in claim 7, further comprising a spacer inserted between said head-supporting part and said head-carrying part.

11. The memory device as claimed in claim 7, wherein said protection member comprises resin.

12. The head assembly as claimed in claim 7, further wherein said protection member includes a hole corresponding to an attaching hole on said head-supporting part.

13. The memory device as claimed in claim 7, wherein said protection member is separate from a protective insulating layer formed on and covering said signal conducting pattern, and further wherein said protection member includes a hole corresponding to an attaching hole on said head-supporting part.

14. A head assembly having a head for recording and reproducing and a head-supporting part for supporting said head, said head assembly comprising:

a signal-conducting pattern formed on said head-supporting part and connected to said head;

a supplement pattern formed around said signal conducting pattern on a portion of said head-supporting part;

a protection member formed at a portion of said head-supporting part so as to protect said signal-conducting pattern, wherein said protection member is separate from a protective insulating layer formed on and covering said signal conducting pattern.

15. The head assembly as claimed in claim 14, further wherein said protection member includes a hole corresponding to an attaching hole on said head-supporting part.

* * * * *

UNITED STATES PATENT AND TRADEMARK OFFICE
CERTIFICATE OF CORRECTION

PATENT NO. : 5,864,446
DATED : January 26, 1999
INVENTOR(S) : Endo et al.

It is certified that error appears in the above-identified patent and that said Letters Patent is hereby corrected as shown below:

Column 8, line 24, delete "bead" and insert

--head-- therefor

Signed and Sealed this

Twenty-third Day of November, 1999

Attest:

Q. TODD DICKINSON

*Attesting Officer*

*Acting Commissioner of Patents and Trademarks*